H. M. POLLOCK & P. CRADDOCK.
SUPPLEMENTARY WIND SHIELD FOR AUTOMOBILES.
APPLICATION FILED SEPT. 22, 1915.
1,198,760.
Patented Sept. 19, 1916.
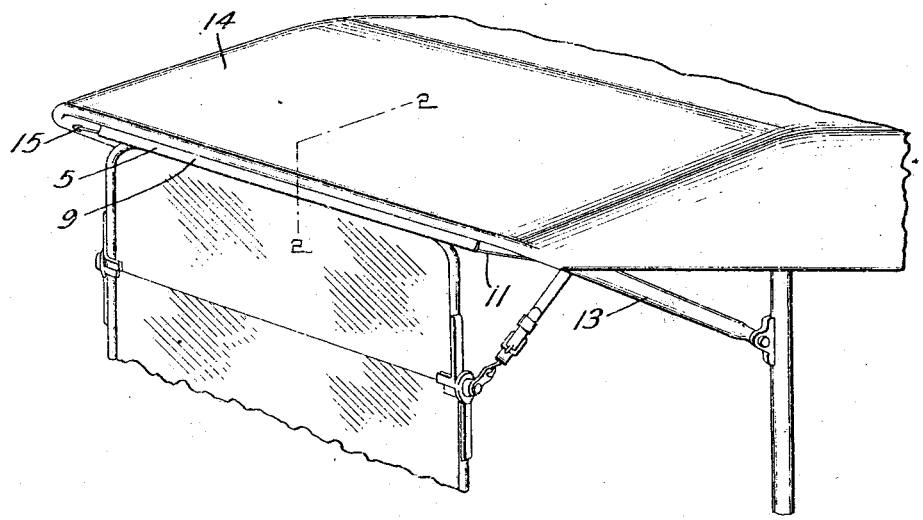
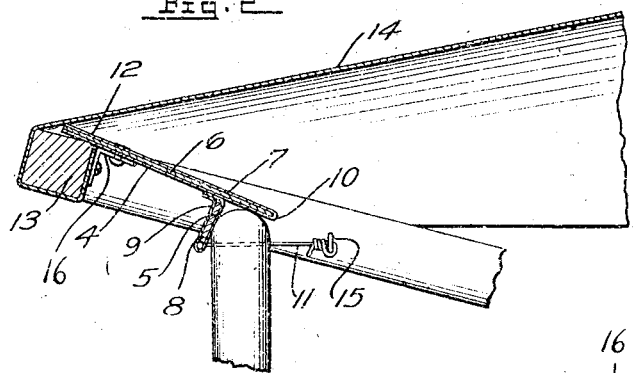
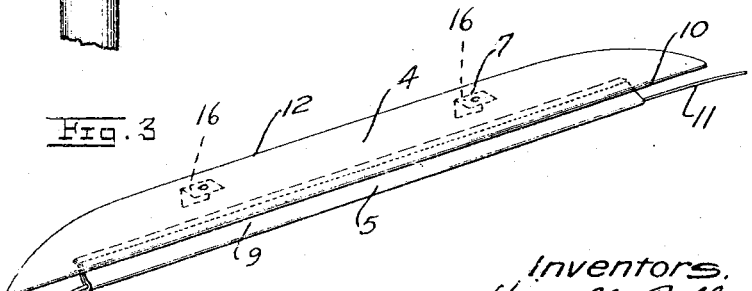
Witnesses:
F. E. Arthur,
W. Thornton Bogert
Inventors.
Harry M. Pollock
BY Peter Craddock
Walter F. Murray Attorney.

UNITED STATES PATENT OFFICE.

HARRY M. POLLOCK AND PETER CRADDOCK, OF CINCINNATI, OHIO; SAID CRADDOCK ASSIGNOR TO SAID POLLOCK.

SUPPLEMENTARY WIND-SHIELD FOR AUTOMOBILES.

1,193,762. Specification of Letters Patent. Patented Aug. 10, 1916.

Application filed March 22, 1915. Serial No. 16,072.

*To all whom it may concern:*

Be it known that we, HARRY M. POLLOCK and PETER CRADDOCK, citizens of the United States of America, and residents of Cincinnati, county of Hamilton, and State of Ohio, have invented certain new and useful Improvements in Supplementary Wind-Shields for Automobiles, of which the following is a specification.

This invention relates to improvements in supplementary wind shields for automobiles and has for an object to produce a supplementary wind shield which will prevent the entrance of wind and rain between the wind shield and the collapsible vehicle top.

In the usual wind shield and top construction there exists a space between the top of the wind shield and the front bow of the folding vehicle top. This space varies to a certain extent in automobiles of different makes, but in each one the space is sufficient to permit of the entrance of wind and rain to the inside of the vehicle. This is particularly objectionable in wet weather. Different devices have been used for closing this space, one class consisting of a depending flap of the same material from which the vehicle top is constructed and are consequently more or less unreliable, rendering them inadequate to afford protection against particularly strong winds which will force the flap up and permit the entrance of wind and rain between the shield and the top. To overcome these objections, we have devised the supplementary shield herein described and illustrated in the accompanying drawings in which:

Figure 1 is a fragmental perspective view of a wind shield and front portion of a vehicle top, with a supplementary wind shield embodying our invention secured thereto. Fig. 2 is a sectional view taken on line 2—2 of Fig. 1. Fig. 3 is a perspective view of the supplementary wind shield folded flat and inverted.

Our proposed supplementary shield is constructed a shield having a core in its upper edge as one of the sides, said core extending longitudinally, and consisting of shield that is preferably formed of some comparatively soft material such as reed beaver 8 which forms the core of the shield, with a covering material 7 extending around the core and consisting of water proof material such as rubberized cloth, which is sewed to form an envelop containing the core 6. The flap 5 is constructed in a similar manner to the body portion 4, the core 8 being formed of the same material and covering as that portion, but the same material as that provided also for the body portion. The upper edge of the flap is sewed to the body portion, forming its rear edge 10. Extending through the lower edge of the flap is a wire 11 the ends of which extend beyond the ends of the flap and are attached to the vehicle top as hereinafter described.

In placing the supplementary shield in position, the body portion 4 is laid on top of the wind shield, with the front edge 12 extending between the top surface of the bow 13 forming the front extension of the vehicle top, and the material 14 of the top, as shown in Fig. 2. Brackets 15 which have been previously riveted or otherwise secured to the body portion 4 as shown in Figs. 2 and 3, are then secured to the inner edge of the bow by means of screws or other suitable fastening means. The flap 5 is bent down at the rear of the wind shield to provide a space between the rear edge 10 and the top, covering the top edge of the wind shield. In a suitable position adjacent to the ends of the flap and on the bow 13 are secured fastening means such as screw eyes 16 to receive the ends of the wire 11, which extend beyond the flap 5. The manner of securing the wire to the screw eyes consists merely in twisting its ends as shown in Fig. 2 and at the time of forming the twists, being sure that the flap 5 is drawn tightly against the front edge of the wind shield. This prevents the flap from vibrating from the pressure of the wind while the car is in motion, as well as holding the rear edge 10 of the body portion 4 against the top of the wind shield.

Although we have described our supplementary wind shield as being applied to cars having the upper portion of the wind shield adapted to be folded inward, it will be understood that it may also be applied to cars having the upper portion of the wind shield adapted to be folded outward toward the front of the vehicle to a position over the hood of the motor. In this case the flap 5 will occupy a position against the rear edge of the upper portion of the wind shield, the fastening wire 11 and screw eyes 16 being secured to the front bow 13 in such a position as to draw the flap against the rear edge of the wind shield instead of against its front edge as shown.

It will be seen that with our supplementary shield we have provided a simple and efficient means of preventing entrance of wind and rain to the interior of the vehicle, between the top of the wind shield and the collapsible vehicle top, and that in use the supplementary wind shield need not be detached from the collapsible top when it is moved to its folded position, it being held against displacement by the brackets 16, screw eyes 15 and the wire 11 secured thereto.

Having thus described our invention, what we claim is:

1. A supplemental wind shield comprising a body portion having its front edge engaging the front bow of the collapsible vehicle top with its rear edge engaging and supported by the top edge of the wind shield, brackets securing the body portion to the front bow, and a flap secured at its upper edge to the body portion and adjacent to the rear edge thereof, for engaging the wind shield, the ends thereof being free from the body portion and having means extending therefrom for attachment to the sides of the front bow of the vehicle top.

2. A supplemental wind shield comprising a body portion having its front edge located between the front bow and the covering of the collapsible vehicle top and supported by the bow with its rear edge engaging and supported by the top edge of the wind shield, a flap secured to the body portion adjacent to the rear edge thereof, for engaging the wind shield, and means for securing the ends of the flap to the sides of the front bow, whereby the flap will be maintained in engagement with the wind shield.

3. A supplemental wind shield comprising a body portion having its front edge engaging the front bow of the collapsible vehicle top with its rear edge engaging and supported by the top edge of the wind shield, brackets securing the body portion to the front bow, a flap secured to the body portion adjacent to the rear edge thereof, for engaging the wind shield, and means for securing the ends of the flap to the sides of the front bow, whereby the flap will be maintained in engagement with the wind shield.

4. A supplemental wind shield comprising a body portion having its front edge located between the front bow and the collapsible vehicle top and supported by the bow with its rear edge engaging and supported by the top edge of the wind shield, brackets securing the body portion to the front bow, a flap secured to the body portion adjacent to the rear edge thereof, for engaging the wind shield, and means for securing the ends of the flap to the sides of the front bow, whereby the flap will be maintained in engagement with the wind shield.

5. A supplemental wind shield comprising a body portion having its front edge located between the front bow and the covering of the collapsible top when supported by the bow with its rear edge engaging and supported by the top edge of the wind shield, brackets secured to the body portion for securing the body portion to the front bow, a flap secured to the body portion adjacent to the rear edge thereof, for engaging the wind shield, and means extending longitudinally of the flap for attachment to the sides of the front bow, whereby the flap will be maintained in engagement with the wind shield.

In testimony whereof, we have hereunto subscribed our names this 21st day of September, 1915.

HARRY M. POLLOCK.
PETER CRADDOCK.

Witnesses:
  WALTER F. MURRAY,
  W. THORNTON BOGERT.